(12) United States Patent
Suzuki et al.

(10) Patent No.: US 6,236,437 B1
(45) Date of Patent: May 22, 2001

(54) TELEVISION TUNER CAPABLE OF RECEIVING SIGNALS WITHOUT BEING RESTRICTED BY APPLICATION SITE AND TELEVISION SIGNAL RECEIVING UNIT FOR PERSONAL COMPUTER USING THE SAME

(75) Inventors: Takeo Suzuki, Haramachi; Shigeru Osada, Shinchi-machi; Toshiro Furuta, Iwanuma, all of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/126,674

(22) Filed: Jul. 30, 1998

(30) Foreign Application Priority Data

Jul. 30, 1997  (JP) ..................................... 9-204810

(51) Int. Cl.$^7$ ..................................... H04N 5/44

(52) U.S. Cl. ..................... 348/731; 348/552; 343/720; 343/822

(58) Field of Search ..................................... 348/725, 552, 348/607, 731; 343/720, 822; 455/188

(56) References Cited

U.S. PATENT DOCUMENTS

| 3,775,707 | * | 11/1973 | Frazier | 333/32 |
|---|---|---|---|---|
| 4,205,317 | * | 5/1980 | Young | 343/720 |
| 4,607,391 | * | 8/1986 | Matsuda | 455/188 |
| 4,790,030 | * | 12/1988 | Carlson et al. | 455/193 |
| 5,528,252 | * | 6/1996 | Skahill | 343/822 |
| 5,737,035 | * | 4/1998 | Rotzoll | 348/725 |

FOREIGN PATENT DOCUMENTS

| 5-102864 | 4/1993 | (JP) . |
|---|---|---|
| 9-69795 | 3/1997 | (JP) . |

* cited by examiner

*Primary Examiner*—Victor R. Kostak
(74) *Attorney, Agent, or Firm*—Brinks Hofer Gilson & Lione

(57) ABSTRACT

A television signal receiving tuner comprising: an input terminal for admitting VHF and UHF band television signals; a correcting circuit connected to the input terminal and having inductors to correct an effective length of an antenna; a branching filter for branching the signals from the correcting circuit into VHF band television signals and UHF band television signals to be output separately; a VHF tuner unit for receiving the VHF television signals from the branching filter; and a UHF tuner unit for receiving the UHF television signals from the branching filter; wherein values of the inductors are made variable

12 Claims, 4 Drawing Sheets

TELEVISION TUNER CAPABLE OF RECEIVING SIGNALS WITHOUT BEING RESTRICTED BY APPLICATION SITE AND TELEVISION SIGNAL RECEIVING UNIT FOR PERSONAL COMPUTER USING THE SAME

BACKGROUND OF THE INVENTION

1. Field of the Invention

The present invention relates to a tuner card for use with a notebook-size personal computer as well as to a tuner incorporated in the tuner card.

2. Description of the Related Art

Recent years have seen the development of a thin-sized television signal receiving unit mounted on a card-type printed-circuit board (called a tuner card) for use with a personal computer Equipped with the tuner card, the personal computer may have television pictures displayed on its display unit.

A conventional tuner card will now be outlined with reference to FIGS. 7 and 8. At one end of a rectangular printed-circuit board 41 is formed a connector part 41a for connection with a personal computer (not shown). At another end of the printed-circuit board 41 in the opposite direction of the connector part 41a is a tuner 42 mounted along the end. The tuner 42 comprises a metal case incorporating a tuner board (not shown) carrying necessary circuitry. On one edge of the metal case is a connector 42a. The tuner 42 is mounted on the print-circuit board 41 so that the connector 42a is oriented in the opposite direction of the connector part 41a. The connector 42 is fed with television signals from an external antenna (not shown).

A region 41b between the connector part 41a and the tuner 42 on the printed-circuit board 41 comprises electronic parts (not shown) constituting digital circuits. These circuits serve as an interface that allows video and other signals from the tuner 42 to be admitted to the personal computer.

The tuner card is inserted into the personal computer through a slot (not shown) on one side of the PC body, so that the connector part 41a is plugged into a connector (not shown) inside the PC. In this state, the region 41b carrying the electronic parts making up the digital circuits is located within the slot while the tuner 42 extends laterally outside the PC. The height of the region 41b on the printed-circuit board 41 is about 5 mm so that the card fits snugly into the PC slot.

An antenna, not shown, is connected to the connector 42a on the side of the tuner 42. Through the antenna and the connector 42a, television signals are input to the tuner 42.

FIG. 8 is a schematic block diagram of the tuner 42. As illustrated, an input terminal 51 connected to the connector 42a admits television signals on the VHF and UHF bands The television signals are split by a branching circuit 52 into the signals on the VHF band and those on the UHF band The branched signals are input respectively to a VHF tuner unit 53 and a UHF tuner unit 54 wherein the television signal of a desired channel is selected and converted in frequency to an intermediate frequency signal. The intermediate frequency signal is amplified and accorded a selective specificity by an intermediate frequency circuit 55. From the circuit 55, the signal is sent to a demodulator 56 which derives video signal V and audio signal A from the received signal.

The tuner 42 has a band switching voltage generating circuit 57 for selecting a reception band to which the selected television signal belongs. A channel selecting signal S either from a television set or from the personal computer is admitted to the band switching voltage generating circuit 57. There are three kinds of reception bands: the UHF band, the VHF high-band, and the VHF low-band. Where a UHF band television signal is to be received, the band switching voltage generating circuit 57 outputs a UHF band switching voltage UB through its output terminal 57a to the UHF tuner unit 54. Likewise, upon reception of a VHF high-band television signal, the circuit 57 outputs a high-band switching voltage HB through its output terminal 57b to the VHF tuner unit 53; for receiving a VHF low-band television signal, the band switching voltage generating circuit 57 outputs a low-band switching voltage LB through its output terminal 57c to the VHF tuner unit 53.

There are some disadvantages involved in the use of the conventional tuner above constituting a tuner card for use with the notebook-size personal computer. The notebook computer is originally intended for portable and mobile use free from constraints specific to the location. If an antenna is available at the site of use or if an antenna cable connected to an exterior antenna is led into the site, that antenna or antenna cable may be connected to the connector 42a of the tuner 42. In many cases, however, neither antenna nor antenna cable is available where the notebook computer is desired to be operated. This poses limits to where the notebook computer may be used if television signals need to be admitted to the computer.

SUMMARY OF THE INVENTION

It is therefore an object of the present invention to provide a tuner card and a television signal receiving tuner incorporated in the tuner card for use with a notebook-size personal computer, the tuner card and the tuner being arranged to receive television signals free from constraints specific to the site of PC use.

In carrying out the invention and according to one aspect thereof, there is provided a television signal receiving tuner comprising: an input terminal for admitting VHF and UHF band television signals; a correcting circuit connected to the input terminal and having inductors to correct an effective length of an antenna; a branching filter for branching the signals from the correcting circuit into VHF band television signals and UHF band television signals to be output separately; a VHF tuner unit for receiving the VHF television signals from the branching filter; and a UHF tuner unit for receiving the UHF television signals from the branching filter; wherein values of the inductors are made variable.

In a preferred structure according to the invention, the inductors of the correcting circuit in the television signal receiving tuner may be switched progressively from small to large inductance values from the time of UHF band reception wherein the UHF band television signals are received, to the time of VHF high-band reception wherein high-frequency VHF television signals are received, to the time of VHF low-band reception wherein low-frequency VHF band television signals are received.

In another preferred structure according to the invention, the television signal receiving tuner may further comprise a band switching voltage generating circuit for generating a band switching voltage from different terminals depending on the reception band. With this structure, the correcting circuit may include: a first and a second inductors connected in series; a first switching diode connected parallel to the serial connection of the first and the second inductors; and a second switching diode connected parallel to the second inductor. At the time of UHF band reception, the band switching voltage is supplied to the first switching diode to turn on the diode; at the time of VHF high-band reception, the band switching voltage is supplied to the second switching diode to turn on the diode.

In a further preferred structure according to the invention, a television signal receiving unit for use with a personal computer may comprise a rectangular printed-circuit board having a connector unit formed on one end thereof, the connector unit being inserted into a slot of a body of the personal computer so as to be coupled with a connector within the body, the rectangular printed-circuit board further comprising the television signal receiving tuner.

In an even further preferred structure according to the invention, the inductors of the correcting circuit in the television signal receiving unit for use with a personal computer may be switched progressively from small to large inductance values from the time of UHF band reception wherein the UHF television signals are received, to the time of VHF high-band reception wherein high-frequency VHF television signals are received, to the time of VHF low-band reception wherein low-frequency VHF band television signals are received.

In a still further preferred structure according to the invention, the television signal receiving unit for use with a personal computer may further comprise a band switching voltage generating circuit for generating a band switching voltage from different terminals depending on the reception band. With this structure, the correcting circuit may include: a first and a second inductors connected in series; a first switching diode connected parallel to the serial connection of the first and the second inductors; and a second switching diode connected parallel to the second inductor. At the time of UHF band reception, the band switching voltage is supplied to the first switching diode to turn on the diode; at the time of VHF high-band reception, the band switching voltage is supplied to the second switching diode to turn on the diode.

In a yet further preferred structure according to the invention, another end of the printed-circuit board in the television signal receiving unit for use with a personal computer may have a line-type antenna furnished on the board in the form of a conductor pattern, the antenna being set for a ¼ wavelength with respect to a substantially intermediate frequency on the UHF television signal band, one end of the antenna being connected to the input terminal.

According to another aspect of the invention, there is provided a television signal receiving unit for use with a personal computer, the television signal receiving unit comprising a rectangular printed-circuit board having a connector unit formed on one end thereof, the connector unit being inserted into a slot of a body of the personal computer so as to be coupled with a connector within the body, the printed-circuit board including: an input terminal for admitting VHF and UHF band television signals; a correcting circuit connected to the input terminal and having inductors to correct an effective length of an antenna; a branching filter for branching the signals from the correcting circuit into VHF band television signals and UHF band television signals to be output separately; a VHF tuner unit for receiving the VHF television signals from the branching filter; and a UHF tuner unit for receiving the UHF television signals from the branching filter; wherein values of the inductors are made variable.

Other objects, features and advantages of the invention will become more apparent upon a reading of the following description and appended drawings.

DESCRIPTION OF THE PREFERRED EMBODIMENTS

Figure 1:
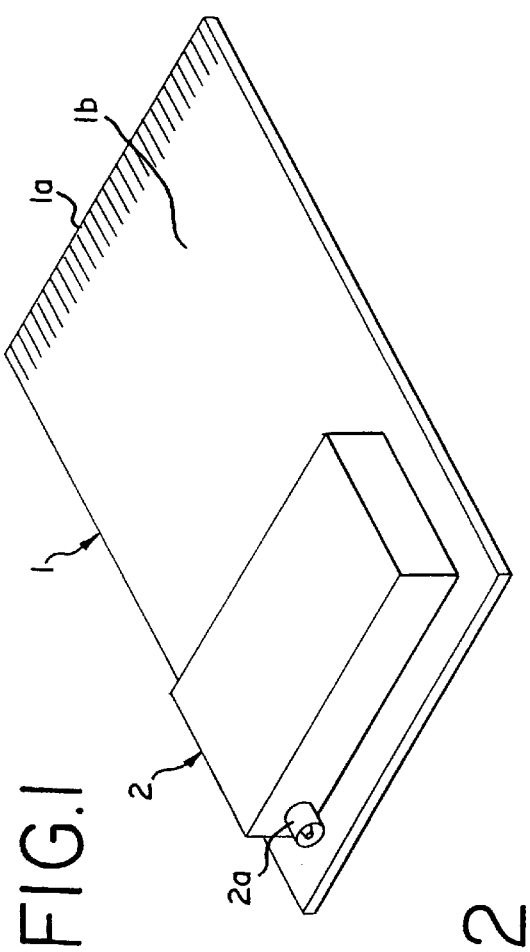
FIG. 1 is a perspective view of a television signal receiving unit for use with a personal computer and practiced as a first embodiment of the invention.

The first embodiment of a television signal receiving unit (called the tuner card hereunder) used by a personal computer along with a television signal receiving tuner (called the tuner hereunder) incorporated in the tuner card will now be described with reference to FIGS. 1 through 3. In FIG. 1, a connector part 1a is formed at one end of a rectangular printed-circuit board 1. At another end of the printed-circuit board 1 in the opposite direction of the connector part 1a is a tuner 2 mounted along the end. The tuner 2 comprises a metal case incorporating a tuner board (not shown) carrying necessary circuitry. On one edge of the metal case is a connector 2a. The tuner 2 is mounted on the print-circuit board 1 so that the connector 2a is oriented in the opposite direction of the connector part 1a. The connector 2 is fed with television signals from an antenna not shown (called the external antenna hereunder). A region 1b between the connector part 1a and the tuner 2 on the printed-circuit board 1 comprises electronic parts (not shown) constituting digital circuits. These digital circuits serve as an interface that allows video and other signals, obtained by the tuner 2 demodulating the television signals, to be admitted to the personal computer.

The tuner card is inserted into the personal computer through a slot (not shown) on one side of the PC body, so that the connector part 1a is plugged into a connector (not shown) inside the PC. In this state, the region 1b carrying the electronic parts making up the digital circuits is located within the slot while the tuner 2 extends laterally outside the PC. The height of the region 1b including the thickness of the printed-circuit board 1 is about 5 mm so that the card fits snugly into the PC slot.

The external antenna is connected to the connector 2a on the side of the tuner 2 that admits the television signals. The external antenna should preferably be a bar-type antenna about 12 centimeters long, i.e., one-fourth of the wavelength corresponding to a frequency of 600 MHz at the approximate center of the UHF television signal band. The antenna is secured by suitable means to the vicinity of the tuner card, e.g., to a side of the PC body.

Figure 2:
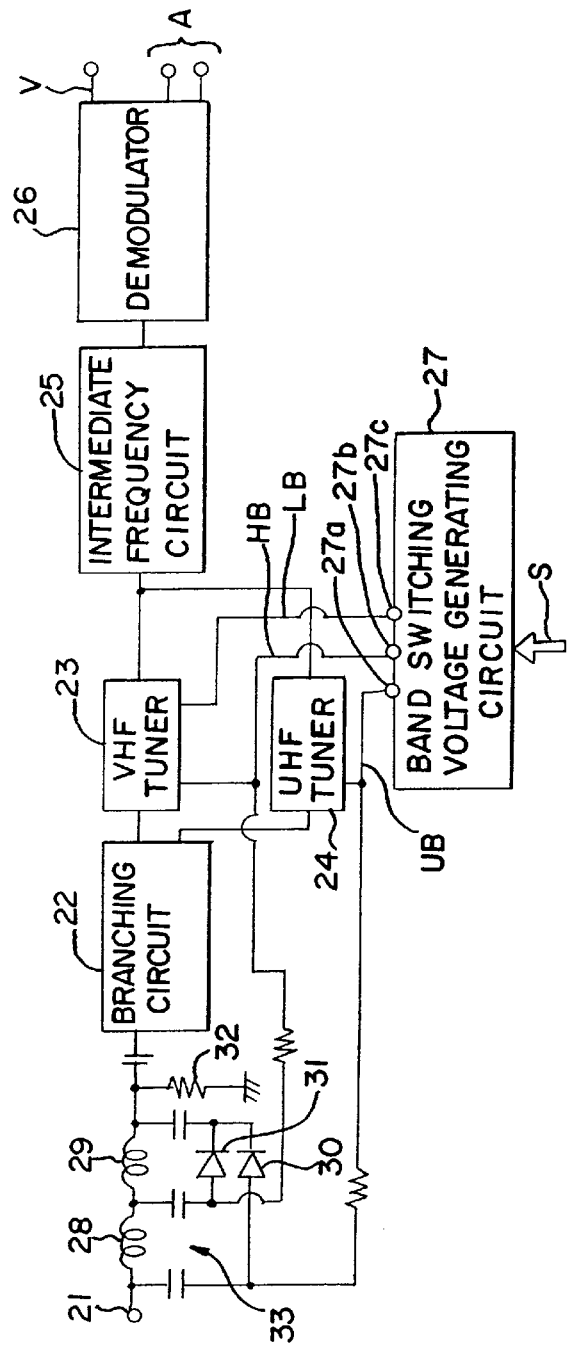
FIG. 2 is a block diagram of a television signal receiving tuner according to the invention.

FIG. 2 is a block diagram of the tuner 2. In FIG. 2, an input terminal 21 is coupled with the connector 2a. The input terminal 21 admits VHF and UHF band television signals. These television signals are divided by a branching circuit 22 into the television signals on the VHF band and those on the UHF band. The branched signals are input respectively to a VHF tuner unit 23 and a UHF tuner unit 24 wherein the television signal of a desired channel is selected and converted in frequency to an intermediate frequency signal. The intermediate frequency signal is amplified and accorded a selective specificity by an intermediate frequency circuit 25. From the circuit 25, the signal is sent to a demodulator 26 which derives video and audio signals V and A from the received signal.

The VHF tuner unit 23 is switched to one of two receptive states: a state in which high-band (high frequency band) VHF television signals are received, and a state in which low-band (low frequency band) VHF television signals are received. The switching is accomplished by a band switching voltage generating circuit 27 included in the tuner 2, the circuit 27 generating a band switching voltage based on a channel selecting signal S coming either from a television set or from the personal computer. The band switching voltage generating circuit 27 has three output terminals 27a, 27b and 27c through which to output a band switching voltage. Where a UHF band television signal is desired to be received, the band switching voltage generating circuit 27 outputs a UHF band switching voltage UB through the terminal 27a to the UHF tuner unit 24. The voltage UB activates the UHF tuner unit 24.

Upon reception of a VHF high-band television signal, the band switching voltage generating circuit 57 outputs a high-band switching voltage HB through its output terminal 27b to the VHF tuner unit 23. The voltage HB brings the VHF tuner unit 23 into a high-band reception state. For receiving a VHF low-band television signal, the band switching voltage generating circuit 27 outputs a low-band switching voltage LB through its output terminal 27c to the VHF tuner unit 23. The voltage LB places the VHF tuner unit 23 into a low-band reception state.

The input terminal 21 and the branching circuit 22 are connected by means of a first and a second inductors 28 and 29 connected in series. In this setup, the external antenna connected to the input terminal 21, the first inductor 28, and the second inductor 29 combine to act substantially as an antenna. A first switching diode 30 is connected parallel to the serial connection of the two inductors, and a second switching diode 31 is connected parallel to the second inductor 29. The anode of the first switching diode 30 is fed with the UHF band switching voltage UB for receiving the UHF band television signals, and the anode of the second switching diode 31 is supplied with the high-band switching voltage HB for receiving the VHF high-band television signals. The cathode of the first switching diode 30 and that of the second switching diode 31 are both connected to ground via a resistor 32. The first inductor 28, the second inductor 29, the first switching diode 30, and the second switching diode 31 constitute a correcting circuit 33 that corrects the effective electrical length of the external antenna connected to the input terminal 21.

Where the tuner 2 is to receive a UHF band television signal, the UHF band switching voltage UB is fed to the anode of the first switching diode 30. The voltage UB causes the first switching diode 30 to conduct, short-circuiting both ends of the serial connection made up of the first and the second inductors 28 and 29. This connects the input terminal 21 directly to the branching circuit 22 in terms of high frequencies. That is, the UHF band television signals received by the external antenna, not shown, are input directly to the branching circuit 22. The television signals over the entire UHF band are now ready to be received, although there are some drops in sensitivity at the low and high ends of the UHF band.

Where the tuner 2 is to receive a VHF high-band television signal, the high-band switching voltage HB is fed to the anode of the second switching diode 31. The voltage HB causes the second switching diode 31 to conduct, short-circuiting both ends of the second inductor 29 in the serial connection made up of the two inductors. This connects the input terminal 21 to the branching circuit 22 via the first inductor 28. With the first inductor 28 connected to the external antenna, the effective length of the antenna is increased. When the inductance of the first inductor 28 is suitably varied, the effective length of the antenna may be adjusted for the optimal reception of the center frequency on the VHF band, i.e., about 195 MHz. This allows the VHF band television signals received by the external antenna, not shown, to be input to the branching circuit 22 via the first inductor 28. As in the case above, the television signals over the entire VHF high-band are now ready to be received, although there are some drops in sensitivity at the low and high ends of the VHF high-band.

Where the tuner 2 is to receive a VHF low-band television signal, the low-band switching voltage LB is not fed to the first or second switching diode 30 or 31. Both ends of the first and the second inductors 28 and 29 are not short-circuited. That is, the input terminal 21 is connected to the branching circuit 22 via the serial connection made up of the two inductors. With the external antenna, the first inductor 28 and the second inductor 29 now connected in series, the effective length of the antenna is increased further In this case, too, suitably varying the inductance of the second inductor 29 adjusts the effective length of the antenna for the optimal reception of the center frequency on the VHF low-band, i.e., about 100 MHz. This allows the VHF band television signals received by the external antenna, not shown, to be input to the branching circuit 22 via the first and the second inductors 28 and 29. The television signals over the entire VHF low-band are now ready to be received, although there are some drops in sensitivity at the low and high ends of the VHF low-band.

As described, the television signal receiving tuner 2 of the invention has the correcting circuit 33 interposed between the input terminal 21 and the branching circuit 22, the correcting circuit 33 correcting the effective electrical length of an external antenna. Thus simply attaching a bar-type antenna to the input terminal 21 allows the tuner 2 to receive television signals ranging from the UHF band to the VHF band.

The inventive tuner card, i.e., the television signal receiving unit for use with a personal computer comprises the television signal receiving tuner 2 having the correcting circuit 33 mounted on the printed-circuit board 1 to be inserted into a slot on the PC body, the circuit 33 correcting the effective electrical length of the antenna. Where an antenna cable derived from an outdoor antenna is not led to the proximity of the site for PC use, a simple bar-type antenna may be provided on a side of the PC body and plugged into the connector 2a of the tuner 2 when necessary. This allows the tuner card to receive television signals ranging from the UHF band to the VHF band free from constraints specific to the site for PC use.

In the tuner 2, the UHF band switching voltage UB fed to the UHF tuner unit 2 causes the first switching diode 30 to conduct, while the high-band switching voltage HB supplied to the VHF tuner unit 23 causes the second switching diode 31 to conduct. This makes it easy to change the inductance value of the serial connection made up of the first and the second inductors 28 and 29 in the correcting circuit 33 in keeping with band switching operations of the tuner 2.

Figure 3:
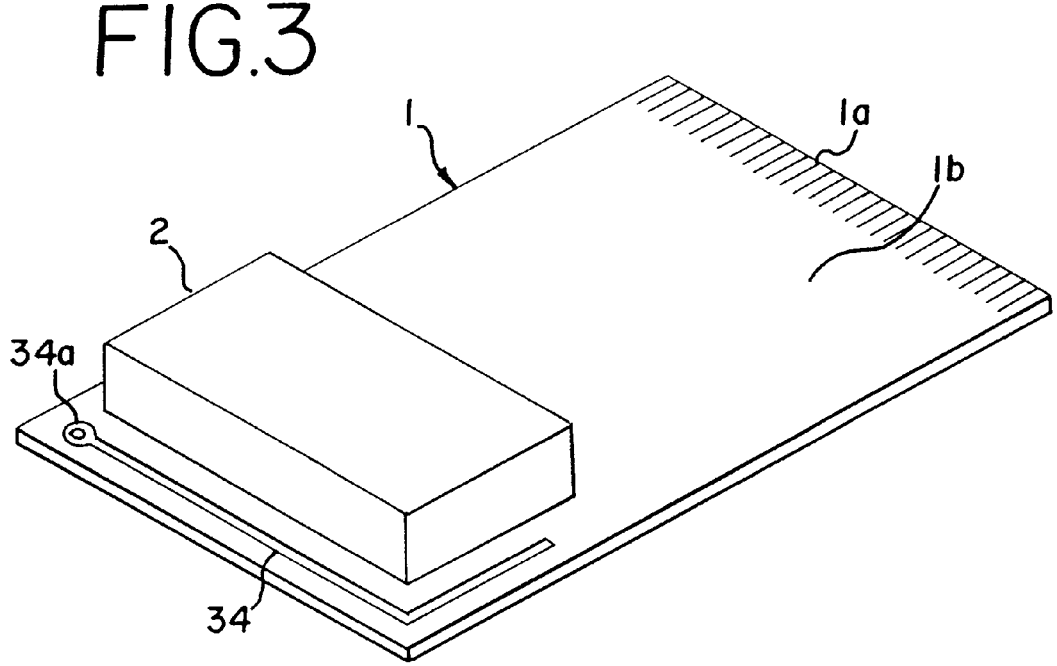
FIG. 3 is a perspective view of a variation of the first embodiment.

As shown in FIG. 3, the external antenna 34 connected to the input terminal 21 of the tuner 2 is furnished in the form of a conductor pattern along that end 34a of the printed-circuit board 1 which is in the opposite direction of the connector part 1a. Having the end 34a connected to the input terminal 21 of the tuner 2 eliminates the need for installing a separate antenna. This setup has no need for the connector 2a shown in FIG. 1. Instead, an antenna terminal (not shown) connected to the input terminal 21 is allowed to project downward as viewed in FIG. 3. The antenna terminal may penetrate through the printed-circuit board 1 to link with the end 34a of the antenna 34 using such suitable means as a conductor pattern (not shown) on the bottom of the printed-circuit board 1. If the antenna 34 is not sufficiently long when formed along one end of the printed-circuit board 1, the antenna may be extended to another end of the board to secure the necessary length, as illustrated in FIG. 3.

Because the antenna 34 is provided along that end of the printed-circuit board which is in the opposite direction of the connector part, inserting the board into a PC slot leaves both the tuner 2 and the antenna 34 outside the slot. The exposed location allows the antenna 34 to receive television signals properly.

Figure 4:
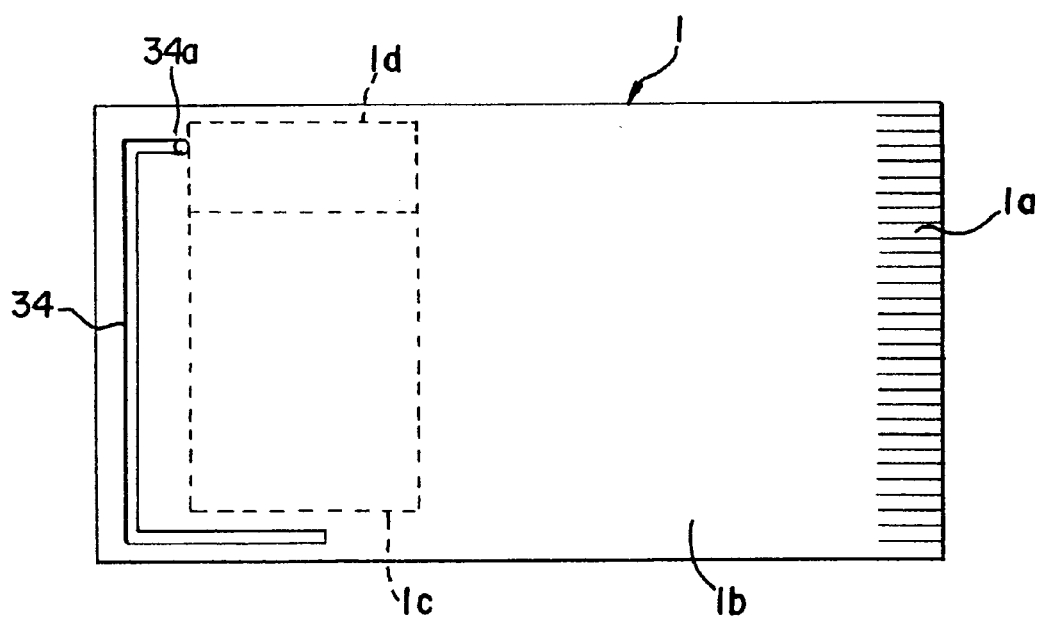
FIG. 4 is a plan view of a television signal receiving unit for use with a personal computer and practiced as a second embodiment of the invention.

The second embodiment of the tuner card according to the invention will now be described with reference to FIG. 4. Of the reference numerals in FIG. 4, those already used in FIGS. 1 through 3 designate functionally identical parts. The connector part 1a is formed at one end of the printed-circuit board 1. Along another end of the board 1 which is in the opposite direction of the connector part 1a is the antenna 34 furnished in the form of a conductor pattern. On the printed-circuit board 1, regions 1c and 1d close to the antenna 34 accommodate circuit blocks (FIG. 2) constituting the tuner 2. Specifically, the region 1d on the printed-circuit board 1 comprises illustratively coils acting as the first and the second inductors 28 and 29 making up the correcting circuit 33 (FIG. 2). Also included in the region 1d are the first and the second switching diodes 30 and 31 as well as the resistor 32. The input terminal 21 of the correcting circuit 33 is connected to one end 34a of the antenna 34.

The region 1c adjacent to the region 1d comprises electronic parts (not shown) constituting such circuit blocks as the branching circuit 22, VHF tuner unit 23, UHF tuner unit 24, intermediate frequency circuit 25, demodulator 26, and band switching voltage generating circuit 27. The electronic parts are mounted directly on the printed-circuit board 1. A metal cover is attached to the printed-circuit board 1 so as to enclose the electronic parts in the regions 1c and 1d.

Mounting the circuit blocks of the tuner 2 directly on the printed-circuit board 1 makes it unnecessary to provide the tuner 2 with a metal case and a tuner board to be housed in the metal case. Free of the conventional attachments, the tuner card may be made thinner than before in structure. In this setup, the high-band switching voltage HB and UHF band switching voltage UB supplied respectively to the VHF tuner unit 23 and UHF tuner nit 24 in the region 1c are also sent respectively to the anode of the second switching diode 31 and to the anode of the first switching diode 30 of the correcting circuit 33 in the region 1d.

With the second embodiment, the electrical effective length of the antenna 34 is also varied easily by changing the inductance value of the serial connection made up of the first and the second inductors 28 and 29 in the correcting circuit 33 in keeping with band switching operations of the tuner 2.

Figure 5:
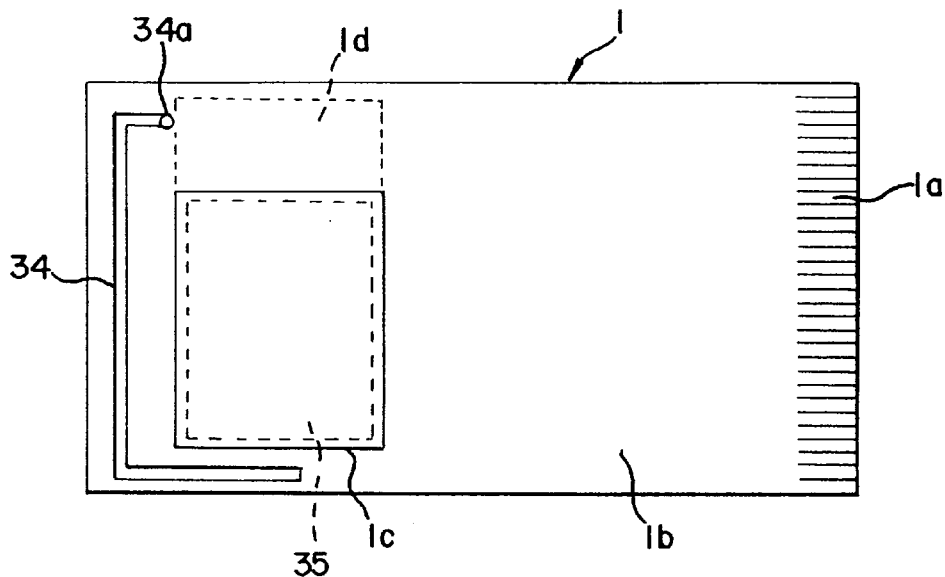
FIG. 5 is a plan view of a television signal receiving unit for use with a personal computer and practiced as a third embodiment of the invention.

The third embodiment of the tuner card according to the invention will now be described with reference to FIG. 5. Of the reference numerals in FIG. 5, those already used in FIGS. 1 through 4 designate functionally identical parts. The connector part 1a is formed at one end of the printed-circuit board 1. Along another end of the printed-circuit board 1 which is in the opposite direction of the connector part 1a is the antenna 34 furnished in the form of a conductor pattern. On the printed-circuit board 1, the region 1d close to one end 34a of the antenna 34 comprises illustratively coils acting as the first and the second inductors 28 and 29 making up the correcting circuit 33 (FIG. 2). Also included in the region 1d are the first and the second switching diodes 30 and 31 as well as the resistor 32. The input terminal 21 of the correcting circuit 33 is connected to the end 34a of the antenna 34.

Figure 6:
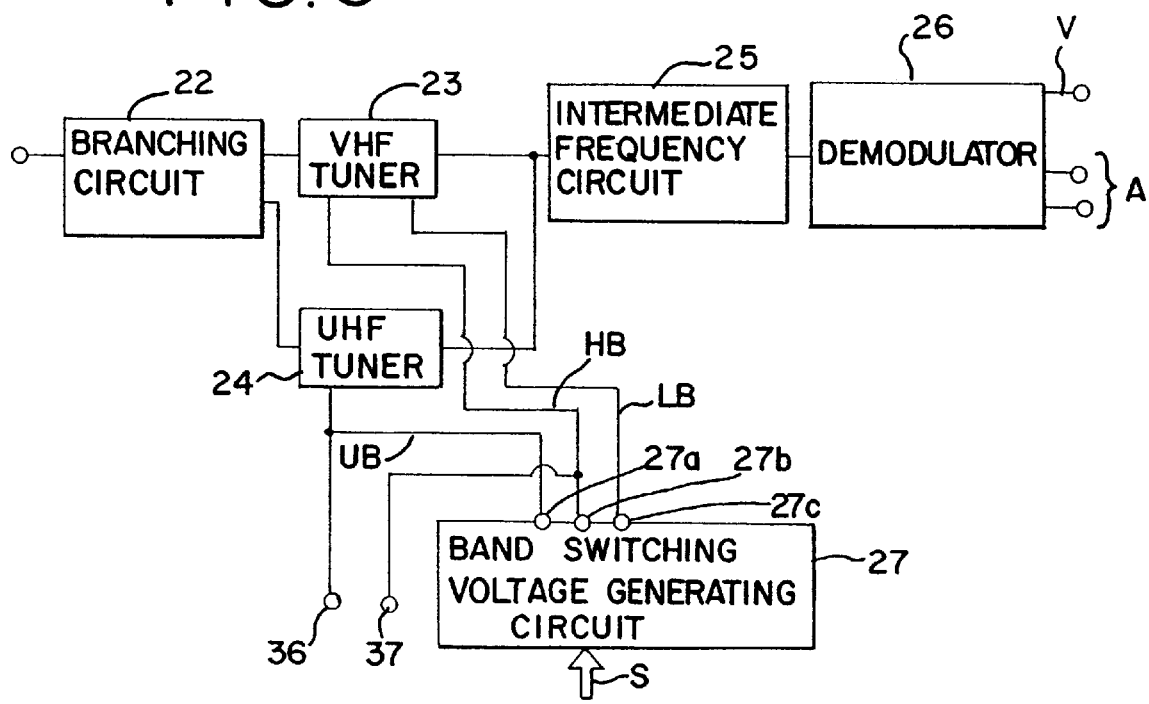
FIG. 6 is a block diagram of a television signal receiving tuner used in the third embodiment.

The region 1c adjacent to the region 1d comprises a tuner 35 having such circuit blocks as the branching circuit 22, VHF tuner unit 23, UHF tuner unit 24, intermediate frequency circuit 25, demodulator 26, and band switching voltage generating circuit 27 shown in FIG. 6. The tuner 35 is made of a tuner board housed in a metal case (neither shown), the tuner board accommodating the circuit blocks. The branching circuit 22 of the tuner 35 is connected by suitable means to the correcting circuit 33 in the region 1d. This allows the television signals received by the antenna 34 to enter the tuner 35 via the correcting circuit 33. The tuner 35 excludes the correcting circuit 33 included in the tuner 2 of FIG. 2. The UHF band switching voltage UB from the band switching voltage generating circuit 27 is supplied to the UHF tuner unit 24; the high-band switching voltage HB and low-band switching voltage LB are fed to the VHF tuner unit 23.

In addition, the UHF band switching voltage UB and high-band switching voltage HB may be sent out from the tuner 35 through its terminals 36 and 37. With the tuner 35 mounted on the printed-circuit board 1, the terminals 36 and 37 penetrate through the board 1. The terminal 36 is connected by suitable means to the anode of the first switching diode 30 inside the correcting circuit 33 in the region 1d. The terminal 37 is connected by appropriate means to the anode of the second switching diode 31. In this setup, the first and the second switching diodes 30 and 31 are supplied respectively with the UHF band switching voltage UB and the high-band switching voltage HB.

Figure 7:
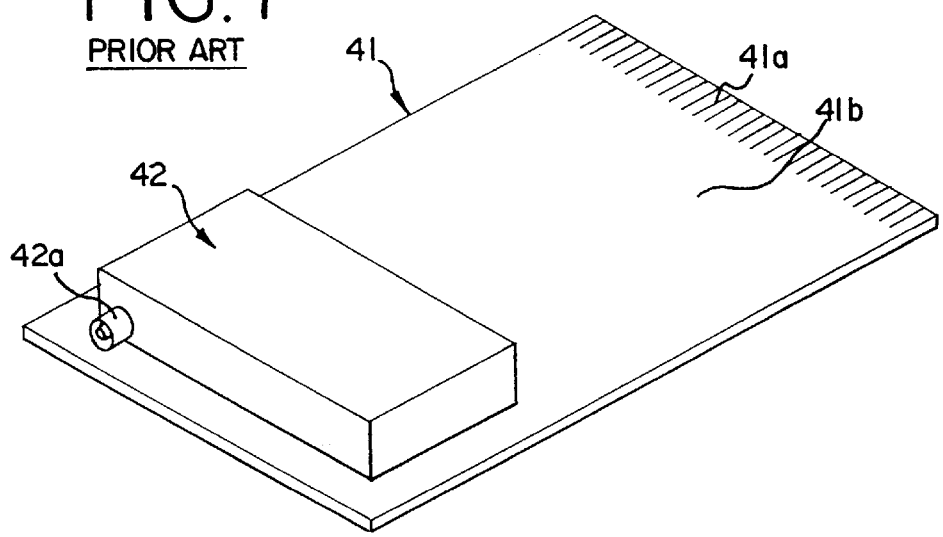
FIG. 7 is a perspective view of a conventional television signal receiving unit for use with a personal computer.
Figure 8:
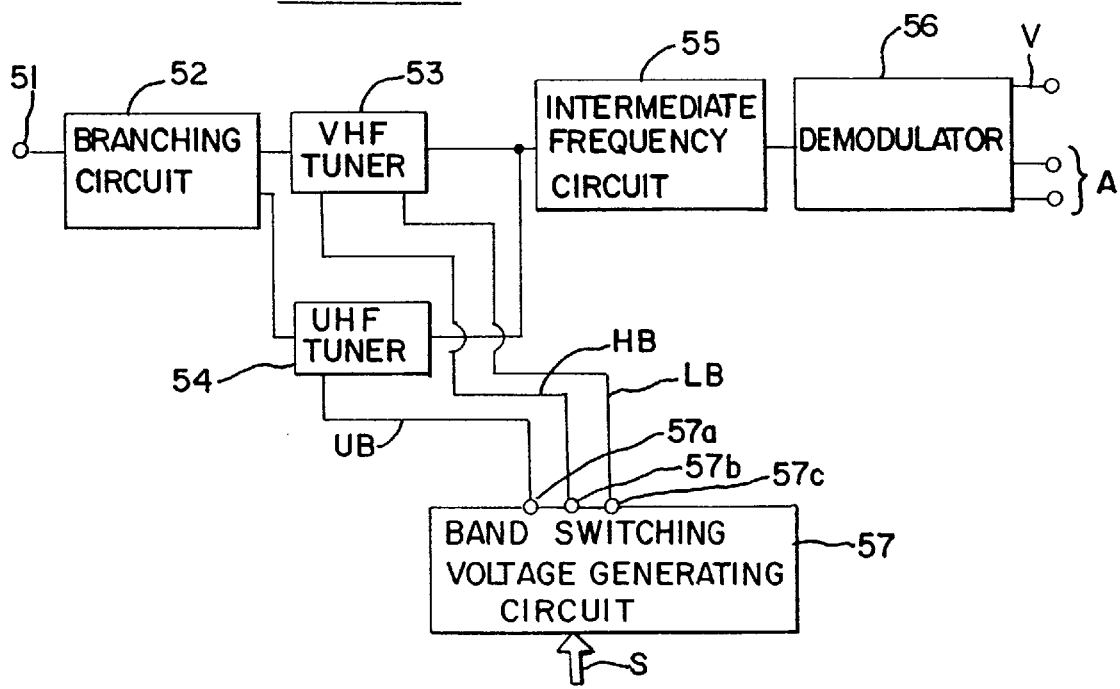
FIG. 8 is a block diagram of a television signal receiving tuner used in the conventional television signal receiving unit.

Unlike the conventional tuner 42 shown in FIGS. 7 and 8, the inventive tuner 35 has the terminals 36 and 37 through which to output externally the UHF band switching voltage UB and the high-band switching voltage HB. This means that simply attaching the terminals 36 and 37 to the conventional tuner 42 readily constitutes the tuner 35 for use in the third embodiment of this invention.

The major features and advantages of this invention are summarized as follows: the television signal receiving tuner according to the invention has a correcting circuit interposed between an input terminal and a branching circuit, the correcting circuit comprising inductors to correct the effective length of an antenna. Varying the inductance value of the inductors makes it possible to change the effective length of a fixed-length external antenna connected to the input terminal for the optimally efficient reception of television signals ranging from the UHF band to the VHF band.

The television signal receiving tuner of the invention may have the necessary arrangements to set the inductance value of the inductors to a minimum for the reception of UHF band television signals, to a maximum for the reception of low-band television signals, and to an intermediate value between the maximum and the minimum for the reception of high-band television signals. With this structure, the inductors in the correcting circuit are varied in inductance in keeping with the reception band currently in effect.

The television signal receiving tuner of the invention may include a first and a second inductors connected in series, a first switching diode connected parallel to the serial connection made of the two inductors, and a second switching diode connected parallel to the second inductor. The first switching diode is fed with a UHF band switching voltage, while the second switching diode is supplied with a high-band switching voltage. This makes it possible to change the inductance of the inductors in the correcting circuit in keeping with the band being switched.

The television signal receiving unit for use with a personal computer according to the invention may have a rectangular printed-circuit board to be inserted into a slot on the PC body. A connector part that may be plugged into a connector inside the PC is formed at one end of the printed-circuit board. At another end of the board, opposite to the connector part, is a television signal receiving tuner having a correcting circuit. With no outdoor antenna in use, simply connecting a bar-type antenna to an input terminal of the television signal receiving tuner permits reception of television signals ranging from the UHF band to the VHF band. This allows the personal computer using the receiving unit to display television pictures on its display unit free from constraints specific to the site for PC use.

The inventive television signal receiving unit for use with a personal computer may have a rectangular printed-circuit board to be inserted into a slot of the PC body. The printed-circuit board may be mounted directly with an input terminal for receiving television signals; a correcting circuit which, comprising inductors, is connected to the input terminal and which corrects the effective length of an antenna attached to the input terminal; and a tuner unit located adjacent to the correcting circuit. The inductance value of the conductors in the correcting circuit is made variable. This structure eliminates the need for a tuner board constituting the tuner unit and a dedicated metal case for housing such a tuner board. Free of these attachments, the structure makes the inventive television signal receiving unit for a personal computer thinner than ever before.

The television signal receiving unit for use with a personal computer according to the invention may have a rectangular printed-circuit board to be inserted into a slot of the PC body. The printed-circuit board may be mounted directly with an input terminal for receiving television signals, and a correcting circuit which, comprising inductors, is connected to the input terminal and which corrects the effective length of an antenna attached to the input terminal. Adjacent to the correcting circuit may be a television signal receiving tuner comprising a branching circuit for branching television signals coming from the correcting circuit, the branched signals being output separately; a VHF tuner unit for receiving VHF band television signals from the branching circuit; and a UHF tuner unit for receiving UHF band television signals from the branching circuit. The inductance value of the inductors in the correcting circuit is made variable. This makes it possible to utilize a conventional tuner deprived of a correcting circuit as the inventive television signal receiving tuner to be mounted on the printed-circuit board. That is, simply attaching the correcting circuit alone to the printed-circuit board readily constitutes a television signal receiving unit for use with a personal computer.

The inventive television signal receiving unit for use with a personal computer may have a line-type antenna furnished on the printed-circuit board in the form of a conductor line. With one end of the line-type antenna connected to the input terminal, there is no need to set up a separate external antenna.

The inventive television signal receiving unit for use with a personal computer may have the antenna length set for a ¼ wavelength with respect to a substantially intermediate frequency on the UHF television signal band. This makes it possible to minimize the antenna length while ensuring the capability of receiving television signals ranging from the VHF band to the UHF band.

With the inventive television signal receiving unit for use with a personal computer, an antenna may be provided at that end of the printed-circuit board which is in the opposite direction of its connector part. This structure leaves the antenna outside the personal computer when the television signal receiving unit is inserted into the PC slot. Located outside the PC body, the antenna receives television signals properly.

In addition, the inventive television signal receiving unit for use with a personal computer may have the necessary arrangements to set the inductance value of the inductors to a minimum for the reception of UHF band television signals, to a maximum for the reception of low-band television signals, and to an intermediate value between the maximum and the minimum for the reception of high-band television signals. With this structure, the inductors in the correcting circuit are varied in inductance in keeping with the reception band currently in effect.

Furthermore, the inventive television signal receiving unit for use with a personal computer may include a first and a second inductors connected in series, a first switching diode connected parallel to the serial connection made of the two inductors, and a second switching diode connected parallel to the second inductor. The first switching diode is fed with a UHF band switching voltage, while the second switching diode is supplied with a high-band switching voltage This makes it possible to change the inductance of the inductors in the correcting circuit in keeping with the band being switched.

As many apparently different embodiments of this invention may be made without departing from the spirit and scope thereof, it is to be understood that the invention is not limited to the specific embodiments thereof except as defined in the appended claims.

What is claimed is:

1. A television signal receiving tuner comprising:
an input terminal for admitting VHF and UHF band television signals;
a correcting circuit connected to said input terminal and having inductors to correct an effective length of an antenna;
a branching filter for branching the signals from said correcting circuit into VHF band television signals and UHF band television signals to be output separately;
a VHF tuner unit for receiving the VHF band television signals from said branching filter; and
a UHF tuner unit for receiving the UHF band television signals from said branching filter;
wherein values of said inductors are made variable;
wherein said inductors of said correcting circuit are switched progressively from small to large inductance values from the time of UHF band reception;

wherein the UHF band television signals are received, to the time of VHF high-band reception; and wherein higher-frequency VHF band television signals are received, and to the time of VHF low-band reception wherein lower-frequency VHF band television signals are received;

said television signal receiving tuner further comprising a band switching voltage generating circuit for generating a band switching voltage from different terminals depending on a reception band, wherein said correcting circuit includes:

a first and a second inductor connected in series;

a first switching diode connected parallel to the serial connection of said first and said second inductors; and a second switching diode connected parallel to said second inductor;

wherein, at the time of UHF band reception, said band switching voltage is supplied to said first switching diode to turn on said first switching diode; and wherein, at the time of VHF high-band reception, said band switching voltage is supplied to said second switching diode to turn on said second switching diode.

2. A television signal receiving unit for use with a personal computer comprising:

a rectangular printed-circuit board having a connector unit formed on one end thereof, said connector unit being inserted into a slot of a body of said personal computer so as to be coupled with a connector within said body, said printed-circuit board further comprising:

an input terminal for admitting VHF and UHF band television signals;

a correcting circuit connected to said input terminal and having inductors to correct an effective length of an antenna;

a branching filter for branching the signals from said correcting circuit into VHF band television signals and UHF band television signals to be output separately;

a VHF tuner unit for receiving the VHF band television signals from said branching filter; and a UHF tuner unit for receiving the UHF band television signals from said branching filter;

wherein values of said inductors are made variable;

wherein said inductors of said correcting circuit are switched progressively from small to large inductance values from the time of UHF band reception;

wherein the UHF band television signals are received, to the time of VHF high-band reception;

wherein higher-frequency VHF television signals are received, and to the time of VHF low-band reception; and wherein lower-frequency VHF band television signals are received;

said television signal receiving unit further comprising a band switching voltage generating circuit for generating a band switching voltage from different terminals depending on the reception band, wherein said correcting circuit includes:

a first and a second inductor connected in series;

a first switching diode connected parallel to the serial connection of said first and said second inductors; and a second switching diode connected parallel to said second inductor;

wherein, at the time of UHF band reception, said band switching voltage is supplied to said first switching diode to turn on said first switching diode; and wherein, at the time of VHF high-band reception, said band switching voltage is supplied to said second switching diode to turn on said second switching diode.

3. A television signal receiving unit for use with a personal computer comprising:

a rectangular printed-circuit board having a connector unit formed on one end thereof, said connector unit being inserted into a slot of a body of said personal computer so as to be coupled with a connector within said body, said printed-circuit board further comprising:

an input terminal for admitting VHF and UHF band television signals;

a correcting circuit connected to said input terminal and having inductors to correct an effective length of an antenna;

a branching filter for branching the signals from said correcting circuit into VHF band television signals and UHF band television signals to be output separately;

a VHF tuner unit for receiving the VHF band television signals from said branching filter;

a UHF tuner unit for receiving the UHF band television signals from said branching filter;

wherein values of said inductors are made variable; and wherein another end of said printed-circuit board has a line-type antenna furnished thereon in the form of a conductor pattern, said antenna being set for a ¼ wavelength with respect to substantially intermediate frequency on the UHF band television signal, one end of said antenna being connected to said input terminal.

4. A television signal receiving unit for use with a personal computer comprising:

a rectangular printed-circuit board having a connector unit formed on one end thereof, said connector unit being inserted into a slot of a body of said personal computer so as to be coupled with a connector within said body, said printed-circuit board including:

an input terminal for admitting VHF and UHF band television signals;

a correcting circuit connected to said input terminal and having inductors to correct an effective length of an antenna;

a branching filter for branching the signals from said correcting circuit into VHF band television signals and UHF band television signals to be output separately;

a VHF tuner unit for receiving the VHF band television signals from said branching filter;

a UHF tuner unit for receiving the UHF band television signals from said branching filter;

wherein values of said inductors are made variable;

wherein said inductors of said correcting circuit are switched progressively from small to large inductance values from the time of UHF band reception;

wherein the UHF band television signals are received, to the time of VHF high-band reception;

wherein higher-frequency VHF band television signals are received, and to the time of VHF low-band reception; and wherein lower-frequency VHF band television signals are received;

said television signal receiving tuner further comprising a band switching voltage generating circuit for generating a band switching voltage from different terminals depending on a reception band, wherein said correcting circuit includes:

a first and a second inductor connected in series;

a first switching diode connected parallel to the serial connection of said first and said second inductors; and a second switching diode connected parallel to said second inductor;

wherein, at the time of UHF band reception, said band switching voltage is supplied to said first switching diode to turn on said first switching diode; and wherein, at the time of VHF high-band reception, said band switching voltage is supplied to said second switching diode to turn on said second switching diode.

5. A television signal receiving unit for use with a personal computer comprising:

a rectangular printed-circuit board having a connector unit formed on one end thereof, said connector unit being inserted into a slot of a body of said personal computer so as to be coupled with a connector within said body, said printed-circuit board further comprising:

an input terminal for admitting VHF and UHF band television signals;

a correcting circuit connected to said input terminal and having inductors to correct an effective length of an antenna;

a branching filter for branching the signals from said correcting circuit into VHF band television signals and UHF band television signals to be output separately;

a VHF tuner unit for receiving the VHF band television signals from said branching filter; and a UHF tuner unit for receiving the UHF band television signals from said branching filter;

wherein values of said inductors are made variable;

wherein said inductors of said correcting circuit are switched progressively from small to large inductance values from the time of UHF band reception;

wherein the UHF band television signals are received, to the time of VHF high-band reception;

wherein higher-frequency VHF band television signals are received, and to the time of VHF low-band reception wherein lower-frequency VHF band television signals are received; and wherein another end of said printed circuit board has a line-type antenna furnished thereon in the form of a conductor pattern, said antenna being set for a ¼ wavelength with respect to a substantially intermediate frequency on the UHF band television signal, one end of said antenna being connected to said input terminal.

6. A television signal receiving unit according to claim 2, wherein another end of said printed circuit board has a line-type antenna furnished thereon in the form of a conductor pattern, said antenna being set for a ¼ wavelength with respect to a substantially intermediate frequency on the UHF band television signal, one end of said antenna being connected to said input terminal.

7. A television signal receiving tuner according to claim 6, further comprising an intermediate frequency circuit to which either an output signal of said VHF tuner or an output signal of said UHF tuner is inputted; and a demodulator for demodulating an intermediate frequency signal outputted from said intermediate frequency circuit are arranged within said television signal receiving tuner.

8. A television signal receiving unit according to claim 4, wherein another end of said printed circuit board has a line-type antenna furnished thereon in the form of a conductor pattern, said antenna being set for a ¼ wavelength with respect to a substantially intermediate frequency on the UHF band television signal, one end of said antenna being connected to said input terminal.

9. A television signal receiving tuner according to claim 8, further comprising an intermediate frequency circuit to which either an output signal of said VHF tuner or an output signal of said UHF tuner is inputted; and a demodulator for demodulating an intermediate frequency signal outputted from said intermediate frequency circuit are directly constituted on said printed-circuit board.

10. A television signal receiving tuner according to claim 3, further comprising an intermediate frequency circuit to which either an output signal of said VHF tuner or an output signal of said UHF tuner is inputted; and a demodulator for demodulating an intermediate frequency signal outputted from said intermediate frequency circuit.

11. A television signal receiving tuner according to claim 3, further comprising an intermediate frequency circuit to which either an output signal of said VHF tuner or an output signal of said UHF tuner is inputted; and a demodulator for demodulating an intermediate frequency signal outputted from said intermediate frequency circuit are arranged within said television signal receiving tuner.

12. A television signal receiving tuner according to claim 5, further comprising an intermediate frequency circuit to which either an output signal of said VHF tuner or an output signal of said UHF tuner is inputted; and a demodulator for demodulating an intermediate frequency signal outputted from said intermediate frequency circuit are arranged within said television signal receiving tuner.

* * * * *